US012672596B2

(12) United States Patent
Subramanian et al.

(10) Patent No.: US 12,672,596 B2
(45) **Date of Patent: \*Jul. 7, 2026**

(54) WORK VEHICLE SYSTEMS AND METHODS FOR SOIL COMPACTION MITIGATION NAVIGATION

(71) Applicant: Deere & Company, Moline, IL (US)

(72) Inventors: Shriraam Prabu Subramanian, Pune (IN); Mahesh Somarowthu, Pune (IN); Tyler D. Schleicher, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 134 days.

This patent is subject to a terminal disclaimer.

(21) Appl. No.: 18/631,752

(22) Filed: Apr. 10, 2024

(65) Prior Publication Data

US 2025/0318453 A1 Oct. 16, 2025

(51) Int. Cl.
*A01B 69/04* (2006.01)
*B60K 35/22* (2024.01)
*A01D 41/127* (2006.01)

(52) U.S. Cl.
CPC ............. *A01B 69/008* (2013.01); *B60K 35/22* (2024.01); *A01D 41/1278* (2013.01); *B60K 2360/166* (2024.01)

(58) Field of Classification Search
CPC .................. A01B 69/008; B60K 35/22; B60K 2360/166; A01D 41/1278; G09G 5/00; G09G 2320/00; G06F 3/00; B60Q 9/00
(Continued)

(56) References Cited

U.S. PATENT DOCUMENTS

| 9,066,465 B2 | 6/2015 | Hendrickson et al. |
| 9,511,633 B2 | 12/2016 | Anderson et al. |

(Continued)

FOREIGN PATENT DOCUMENTS

| CA | 2476482 C | 4/2008 |
| CN | 114935929 B | 8/2023 |

(Continued)

OTHER PUBLICATIONS

Manoj et al., "Development of a tractor operated soil compaction measurement device," 2015, Publisher: IEEE.*

*Primary Examiner* — Tuan C To
(74) *Attorney, Agent, or Firm* — KLINTWORTH & ROZENBLAT LLP

(57) ABSTRACT

An agricultural system includes a sink region sensor configured to collect information regarding a sink region; a vehicle sensor configured to collect information regarding current vehicle weight when proximate to the sink region; and a controller. The controller includes processor and memory architecture executing control logic to: receive the sink region information and extract sink region characteristics; receive the current vehicle weight; determine a potential soil compaction impact of the agricultural work vehicle traversing the sink region in view of the sink region characteristics and the current vehicle weight; generate commands associated with a sink region path to at least partially avoid the sink region when the potential soil compaction impact exceeds a soil compaction constraint for the sink region; and generate commands to proceed along the default path when the potential soil compaction impact does not exceed the soil compaction constraint.

20 Claims, 5 Drawing Sheets

(58) Field of Classification Search
USPC ........................................................ 701/26
See application file for complete search history.

(56) References Cited

U.S. PATENT DOCUMENTS

| | | | |
|---|---|---|---|
| 11,337,360 B2 | 5/2022 | Anderson | |
| 11,432,452 B2 | 9/2022 | Balani et al. | |
| 2011/0295423 A1 | 12/2011 | Anderson | |
| 2017/0059353 A1* | 3/2017 | Madine .............. | G01C 21/3694 |
| 2020/0103904 A1 | 4/2020 | Boydens et al. | |
| 2020/0128734 A1 | 4/2020 | Brammeier et al. | |
| 2020/0349585 A1* | 11/2020 | Hirata .................... | G06N 20/00 |
| 2021/0300547 A1 | 9/2021 | Stanhope et al. | |
| 2023/0160152 A1* | 5/2023 | Doy ...................... | E01C 19/004 |
| | | | 701/50 |
| 2024/0040965 A1 | 2/2024 | Anderson et al. | |
| 2024/0111292 A1* | 4/2024 | Subramanian ......... | G05D 1/617 |
| 2025/0072311 A1 | 3/2025 | Schroeder | |

FOREIGN PATENT DOCUMENTS

| | | | | |
|---|---|---|---|---|
| CN | 119138192 A | 12/2024 | | |
| DE | 102021132200 A1 | 6/2023 | | |
| EP | 3400780 B1 | 1/2020 | | |
| WO | WO-9821930 A1 * | 5/1998 | ............. | G01C 21/20 |
| WO | WO 2024227212 A2 | 11/2024 | | |

* cited by examiner

FIG. 4

WORK VEHICLE SYSTEMS AND METHODS FOR SOIL COMPACTION MITIGATION NAVIGATION

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to agricultural work vehicle systems and methods, and more specifically to systems and methods for soil compaction mitigation.

BACKGROUND OF THE DISCLOSURE

There are a wide variety of different types of agricultural machines, forestry machines, and/or construction machines. Examples of agricultural machines include harvesters, balers, seeders, sprayers, various tractors, and windrowers. During operation, such agricultural machines may implement various types of systems and methods in order to improve overall performance, yield, and production, including mechanisms for dealing with sink regions and soil compaction.

SUMMARY OF THE DISCLOSURE

In one aspect, an agricultural system associated with an agricultural work vehicle configured to operate at least along a default path within a field during an agricultural operation. The system includes a sink region sensor configured to collect information regarding a sink region within the field; a vehicle sensor configured to collect information regarding current vehicle weight when proximate to the sink region within the field; and a controller coupled to the sink region sensor and the vehicle sensor. The controller includes processor and memory architecture executing control logic to: receive the sink region information and extract sink region characteristics from the sink region information; receive the current vehicle weight; determine a potential soil compaction impact of the agricultural work vehicle traversing the sink region in view of the sink region characteristics and the current vehicle weight; generate commands associated with a sink region path to at least partially avoid the sink region when the potential soil compaction impact exceeds a soil compaction constraint for the sink region; and generate commands to proceed along the default path when the potential soil compaction impact does not exceed the soil compaction constraint.

In a further aspect of the agricultural system, the processor and the memory architecture of the controller are configured to further execute control logic to: evaluate an ability of the agricultural work vehicle to navigate the sink region along the default path in view of the sink region characteristics and the current vehicle weight; generate the commands associated with the sink region path to at least partially avoid the sink region when the potential soil compaction impact exceeds a sink region constraint or when the evaluation of the ability of the agricultural work vehicle to navigate the sink region along the default path indicates that the agricultural work vehicle is unable to navigate through the sink region along the default path; and generate commands to proceed along the default path when the potential soil compaction impact does not exceed the sink region constraint and when the evaluation of the ability of the agricultural work vehicle to navigate the sink region along the default path indicates that the agricultural work vehicle is able to navigate through the sink region along the default path.

In a further aspect of the agricultural system, the vehicle sensor is on-board the agricultural work vehicle.

In a further aspect of the agricultural system, the sink region sensor is on-board the agricultural work vehicle.

In a further aspect of the agricultural system, a soil sensor is coupled to the controller and configured to collect soil information within the field; and the processor and the memory architecture of the controller are configured to further execute control logic to: receive the soil information and to extract soil characteristics from the soil information; and determine the potential soil compaction impact further in view of the soil characteristics.

In a further aspect of the agricultural system, the sink region sensor is an image sensor.

In a further aspect of the agricultural system, a display interface is coupled to the controller and configured to display the commands associated with the sink region path to an operator.

In a further aspect of the agricultural system, the commands associated with the sink region path are actuator commands for navigating the agricultural work vehicle.

In a further aspect of the agricultural system, the sink region sensor is offboard of the agricultural work vehicle.

In a further aspect of the agricultural system, the agricultural work vehicle is a harvester.

In another aspect, a method is provided for evaluating sink regions within a field associated with an agricultural work vehicle performing an agricultural operation along at least a default path. The method includes collecting, with a sink region sensor, information regarding a first sink region within the field; collecting, with a vehicle sensor, information regarding current vehicle weight when proximate to the first sink region within the field; extracting, with a controller, sink region characteristics from the sink region information; determining, with the controller a potential soil compaction impact of the agricultural work vehicle traversing the sink region in view of the sink region characteristics and the current vehicle weight; generating, with the controller, commands associated with a sink region path to at least partially avoid the first sink region when the potential soil compaction impact exceeds a soil compaction constraint for the first sink region; and generating, with the controller, commands to proceed along the default path when the potential soil compaction impact does not exceed the soil compaction constraint.

A further aspect of the method includes evaluating, with the controller, an ability of the agricultural work vehicle to navigate the sink region along the default path in view of the sink region characteristics and the current vehicle weight; generating, with the controller, the commands associated with the sink region path to at least partially avoid the sink region when the potential soil compaction impact exceeds a sink region constraint or when the evaluation of the ability of the agricultural work vehicle to navigate the sink region along the default path indicates that the agricultural work vehicle is unable to navigate through the sink region along the default path; and generating, with the controller, commands to proceed along the default path when the potential soil compaction impact does not exceed the sink region constraint and when the evaluation of the ability of the agricultural work vehicle to navigate the sink region along the default path indicates that the agricultural work vehicle is able to navigate through the sink region along the default path.

In a further aspect of the method, the vehicle sensor is on-board the agricultural work vehicle.

In a further aspect of the method, the sink region sensor is on-board the agricultural work vehicle.

A further aspect of the method includes collecting, with a soil sensor, soil information within the field; extracting, with the controller, soil characteristics from the soil information; and determining, with the controller, the potential soil compaction impact further in view of the soil characteristics.

In a further aspect of the method, the sink region sensor is an image sensor.

A further aspect of the method includes displaying, on a display interface, the commands associated with the sink region path.

A further aspect of the method includes executing, with agricultural work vehicle actuators, the commands associated with the sink region path.

In a further aspect of the method, the sink region sensor is offboard of the agricultural work vehicle.

In a further aspect of the method, the agricultural work vehicle is a harvester.

The details of one or more embodiments are set forth in the accompanying drawings and the description below. Other features and advantages will become apparent from the description, the drawings, and the claims.

BRIEF DESCRIPTION OF THE DRAWINGS

FIG. 4 is a schematic representation of segmentation of a sink region as evaluated by the soil compaction mitigation system according to an example embodiment.

DETAILED DESCRIPTION

Figure 1:
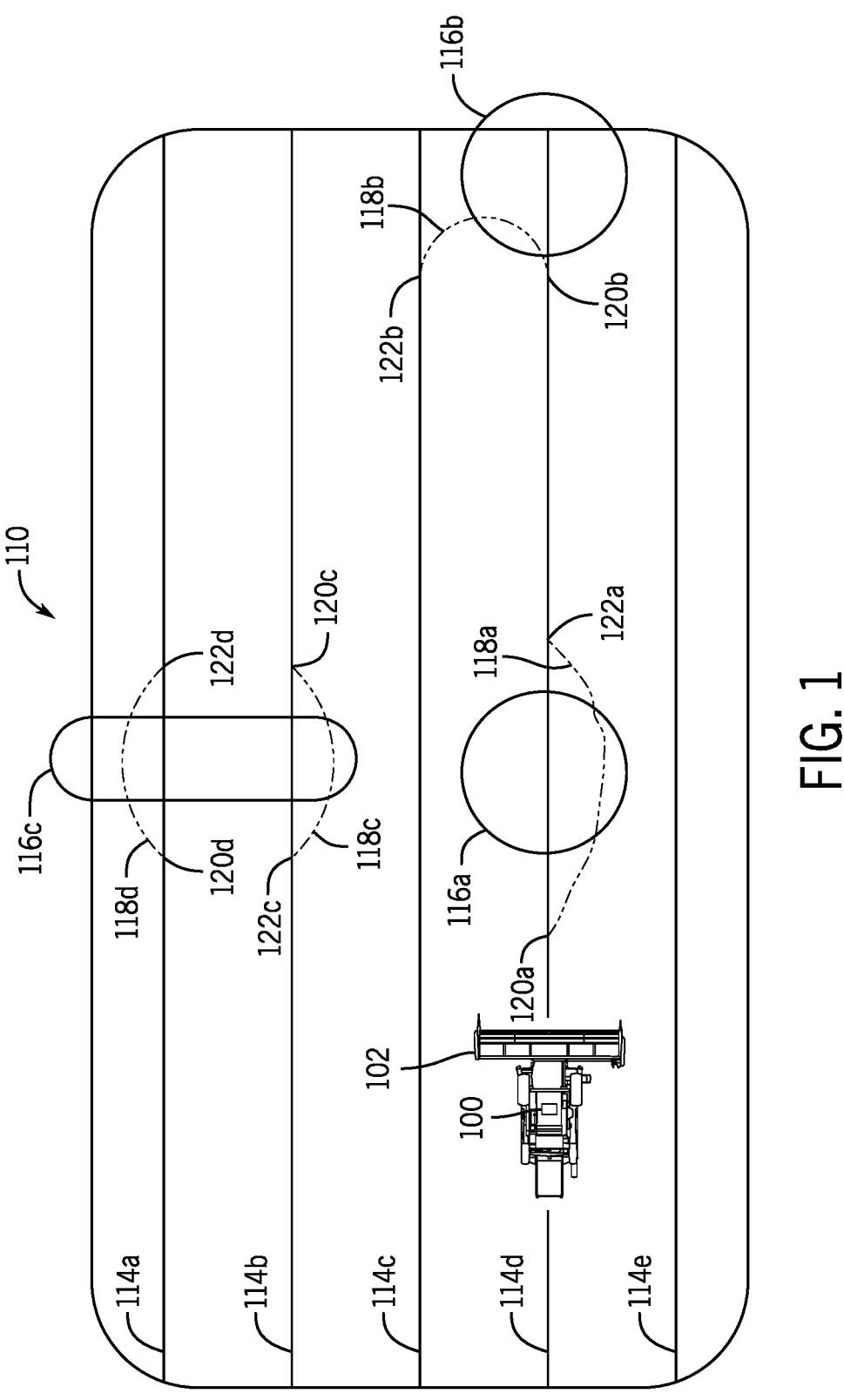
FIG. 1 is an example environment in which a soil compaction mitigation system and/or method may be implemented according to an example embodiment.

The following describes one or more example embodiments of the disclosed system and method, as shown in the accompanying figures of the drawings described briefly above. Various modifications to the example embodiments may be contemplated by one of skill in the art. Discussion herein may sometimes focus on the example application in an agricultural harvester, but the disclosed system and method are applicable to other types of work vehicles and/or other types of work environments.

OVERVIEW

As noted, there are a wide variety of different types of agricultural work vehicle and processes involved in an overall agricultural operation. Examples of agricultural work vehicles include harvesters, windrowers, seeders, sprayers, balers, cutters, mowers, cooperating machines, and the like. During operation and using a harvester example, the agricultural vehicle travels through a field to harvest an agricultural crop. In one common arrangement, agricultural harvesting heads are positioned at the front of the agricultural harvester to engage the plant stalks, sever them, and carry the severed crop into the body of the agricultural harvester itself for further processing, including removal of the residue and storage of the grain such that the grain typically accumulates on the harvester over time. As such, the weight of the work vehicle may be dynamic during operation. In other types of agricultural vehicles, such as seeders and sprayers, the weight of the work vehicle may decrease over time during operation.

Agricultural operations may occur in fields that potentially include many types of conditions and terrain. For example, rain and moisture may cause various issues, including the potential for sink regions. As used herein, the term "sink region" may be considered an area of standing water or moist soil that may impede or prevent traversal through portions of the area due to traction issues and/or would result in undue compaction of the underlying soil.

As discussed in greater detail below, a soil compaction mitigation system and/or method may be provided to identify and address sink regions during operation of an agricultural work machine. In one example, the agricultural work machine may include various types of sensors, including sensors that facilitate identification of sink regions, determine the weight of the work vehicle, and collect other types of information about the work vehicle and/or environment. From this data, the system and method may identify the sink regions such that, upon encountering the sink region, the system and method may evaluate the sink region by extracting or otherwise determining the sink region characteristics. Further, the system and method may evaluate the ability of the work vehicle to navigate the sink region on a current path. Such navigation may depend on the current weight of the work vehicle and the characteristics of the sink region. Additionally, the system and method may evaluate the potential for soil compaction during navigation through or around the sink region. Such evaluation may be a function of the environmental conditions, weight of the work vehicle, and/or sink region characteristics. Subsequently, the system and method may determine whether or not an alternative path is warranted, and if so, the plotting of such an alternative path. Again, the potential for soil compaction and/or the ability of the work vehicle to navigate are considered. If an alternative path is implemented, the system and method may additionally consider further evaluation of the sink region and potentially the processing of the sink region. For example, the work vehicle may return to the area of the sink region later during operation or at a future date. Such determinations may depend on the environmental conditions, weight of the work vehicle, and/or the estimated sink region characteristics at the designated time.

As a result, the soil compaction mitigation system method may provide a more efficient and effective agricultural operation that avoids undue soil compaction and navigation issues.

These and other aspects of the disclosed system and method will be better understood with regard to an example environment and/or work vehicle, which will now be described.

Example Environment and Work Vehicle with Systems and Methods for Sink Region and Soil Compaction Mitigation Navigation and Planning In one example depicted in FIG. 1, an example environment in which a soil compaction mitigation system 100

(and/or method) may be implemented is provided. Generally, as shown, the environment for implementation includes a field 110 in which an agricultural work vehicle 102 is operating. In the particular depicted example, the agricultural work vehicle 102 is a harvester operating to harvest a crop, although other operations and/or other vehicles may also implement the soil compaction mitigation system 100 described herein.

In one example, the work vehicle 102 traverses the field, back and forth, in a series of rows 114a-114e that form a default path, generally within the boundaries of the field. As discussed in greater detail below, the work vehicle 102 may detect and/or account for one or more sink regions 116a-116c (or generally, sink regions 116). In the depicted example, the field 110 includes a first sink region 116a, generally within row 114d; a second sink region 116b, also generally within row 114d at an edge of the field 110; and a third sink region 116c, generally spanning row 114a and row 114b. The sink regions 116 in FIG. 1 are merely examples.

As noted above, generally, a "sink region" may be defined as a wet area in which moisture may causes issues with respect to the work vehicle 102 traversing through the respective sink region (e.g., such that the work vehicle 102 may get stuck or otherwise impeded) and/or may result in undue soil compaction if traversed by the work vehicle 102.

As described below, the soil compaction mitigation system 100 may be implemented with the work vehicle 102 to provide navigation commands to modify an intended, predetermined, or default path, e.g., from the path straight along the rows 114a-114e, to avoid navigation issues and particularly to mitigate soil compaction. In addition to modifying the intended paths, the soil compaction mitigation system 100 may additionally evaluate and provide guidance as to current or future processing of the areas covered by the sink regions (e.g., sink regions 116). As examples, the view of FIG. 1 depicts a number of alternate paths 118a-118d (generally, alternate path 118), including an alternate path 118a between points 120a, 122a around at least a portion of sink region 116a; an alternate path 118b between points 120b, 122b around at least a portion of sink region 116b; a first alternative path 118c between points 120c, 122c around at least a portion of sink region 116c; and a second alternate path 118d between points 120d, 122d around at least a portion of sink region 116c.

The consideration by the soil compaction mitigation system 100 may include the ability to navigate and otherwise pass through or around the sink region 116. In other words, the soil compaction mitigation system 100 considers whether or not the work vehicle 102 will get stuck and/or unduly slowed by passing through or around the sink region 116. Additional consideration includes the potential for soil compaction either within or around the sink region 116. For example, the moisture within the sink region 116 may result in undue soil compaction if traversed by the work vehicle 102. As another example, if a sink region 116 spans a number of rows 114, and it is determined that the work vehicle 102 should avoid the sink region 116, the same area around the sink region 116 may receive more (or multiple) passes of the work vehicle than would otherwise occur to potentially result in undue compaction unless otherwise addressed.

Additional information about traversing the sink regions 116 with the alternate paths 118 and/or otherwise planning based on the potential soil compaction will be discussed below after an introduction of the work vehicle 102 and the components of the soil compaction mitigation system 100.

Figure 2:
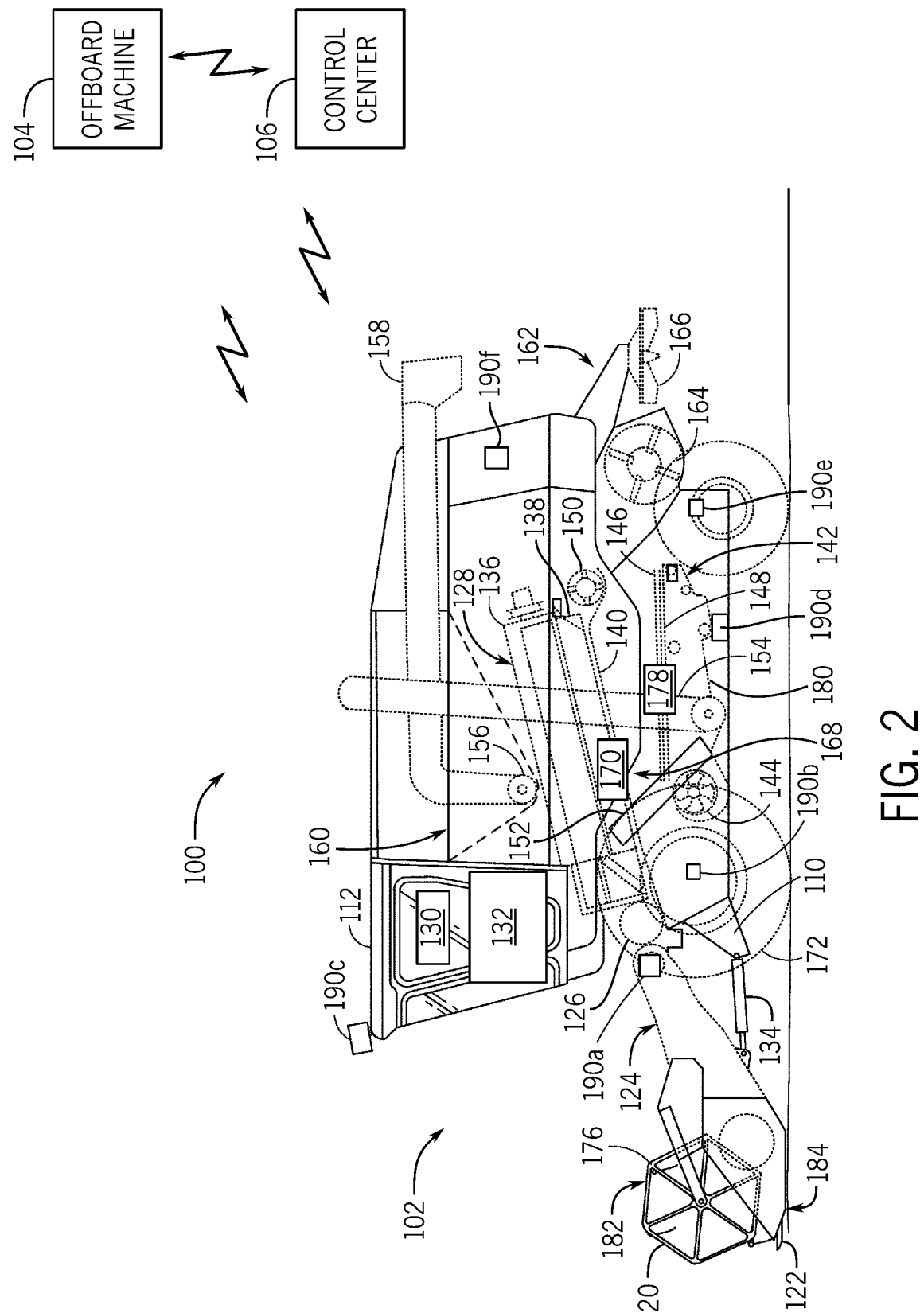
FIG. 2 is an example agricultural work vehicle in the form of a harvester in which the soil compaction mitigation system may be utilized.

An example embodiment of the work vehicle 102 for implementing the soil compaction mitigation system 100 is shown in FIG. 2, which is a partial pictorial, partial schematic, illustration of the soil compaction mitigation system 100 that may be implemented with a work vehicle 102 in the form of a self-propelled agricultural harvester, one or more offboard machines 104, and a control center 106 associated with an agricultural work site (e.g., the field 110 of FIG. 1). In some examples, the offboard machines 104 and/or the control center 106 may be omitted.

The elements within the work site (e.g., field 110) may wirelessly communicate with one another in any suitable manner, including directly (e.g., via Bluetooth®, radio frequency signals, or the like) or over network via communications interfaces discussed in greater detail below. Thus, the communication components discussed below may include a Bluetooth® transceiver, a radio transceiver, a cellular transceiver, an LTE transceiver, and/or a Wi-Fi transceiver. For example, such communications may utilize one or more of various communication techniques or mechanisms, including radio frequency, Wi-Fi, cellular, telematics, and/or any other suitable platforms.

As noted above, in the illustrated example, the work vehicle 102 is a combine harvester. Although combine harvesters are provided as an example, it will be appreciated that the present description is also applicable to other types of harvesters and other types of agricultural work machines in which soil compaction and/or sink regions are an issue. Other examples of agricultural machines are balers, planters, cultivators, herbicide, insecticide or fertilizer applicators, cutters, mowers, and agricultural seeders and sprayers. Additional details about the work vehicle 102 will be discussed below after a brief introduction of the offboard machine 104 and the control center 106.

Generally, the offboard machine 104 may include any cooperating or other agricultural machine (or machines) that may operate or otherwise interact with the work vehicle 102 and/or the soil compaction mitigation system 100 with respect to the field 110, including data collection devices, such as satellites or drones, as well as other, such as other harvesters, manure spreaders, fertilizer applicators, seeders, sprayers, and haulers. Moreover, previous instances or iterations of the work vehicle 102 traversing or operating in the field 110 may be considered an offboard machine 104 within the context of the soil compaction mitigation system 100. Such offboard machines 104 may be manually steered by an operator, controlled remotely, and/or controlled autonomously.

For the purposes of the soil compaction mitigation system 100, the offboard machine 104 may include various types of sensors to collect information about the environment, crop, and/or field. Such information may be considered with respect to the sink region and soil compaction mitigation, as discussed below. As examples, the sensors of the offboard machine 104 may include without limitation cameras, stereo cameras, lidar, infrared sensors, microwave sensors, or other type of sensor. The offboard machine 104 may include any appropriate processing, memory, and/or communications components to implement the functions described herein.

The control center 106 may operate as a "backend" system or server at a remote location, such as the home farm and/or a third-party service provider, that facilitates harvesting and/or harvest monitoring operations, particularly the soil compaction mitigation functions described below. The control center 106 may include any appropriate processing, memory, and/or communications components to implement the functions described herein. The control center may provide various types of information, such as topographical data, historical data, weather data, and the like, as discussed in greater detail below. Such maps may be derived from historical data collection, aerial images, or the like.

Prior to describing how the work vehicle 102 implements aspects of the soil compaction mitigation system 100, a brief description of some of the items on the work vehicle 102 implemented as a harvester will be provided.

As shown in FIG. 2, the work vehicle 102 illustratively includes a frame 180 that supports the various components and elements discussed herein, including an operator compartment 112, which may have a variety of different operator interface mechanisms, for controlling the work vehicle 102. In some examples, the work vehicle 102 may include one or more human-machine interfaces 132 arranged within the operator compartment 112.

Generally, the interface 132 enables an operator to interface with the various aspects of the soil compaction mitigation system 100 (e.g., one or more of other systems and components of the work vehicle 102, the offboard machine 104, and/or the control center 106). In one example, the interface 132 includes at least an input device and a display, either as separate devices or combined. The input device of the interface 132 may include any device capable of receiving user input, including, but not limited to, a keyboard, a microphone, a touchscreen layer associated with the display, or other device to receive data and/or commands from the user. The display of the interface 132 may include any technology for displaying information, including, but not limited to, a liquid crystal display (LCD), light emitting diode (LED), organic light emitting diode (OLED), plasma, or a cathode ray tube (CRT).

In one example, the soil compaction mitigation system 100 and/or work vehicle 102 may include a controller 130 that implements the various functions discussed herein. The controller 130 may be considered a vehicle controller and/or a dedicated system controller or sub-controller and/or distributed at least partially offboard the work vehicle 102 (e.g., including at least partially at the control center 106 and/or the offboard machine 104). In one example, the controller 130 may be implemented with processing architecture such as a processor and memory. For example, the processor may implement the functions described herein based on programs, instructions, and data stored in memory.

As such, the controller 130 may be configured as one or more computing devices with associated processor devices and memory architectures, as a hard-wired computing circuit (or circuits), as a programmable circuit, as a hydraulic, electrical or electro-hydraulic controller, or otherwise. The controller 130 may be configured to execute various computational and control functionality with respect to the work vehicle (or other machinery). In some embodiments, the controller 130 may be configured to receive input signals in various formats (e.g., as hydraulic signals, voltage signals, current signals, and so on), and to output command signals in various formats (e.g., as hydraulic signals, voltage signals, current signals, mechanical movements, and so on). For example, the controller 130 may be in electronic or hydraulic communication with various actuators, sensors, and other devices within (or outside of) the work vehicle 102, including any devices described below. Although not shown or described in detail herein, the work vehicle 102 may include any number of additional or alternative systems, subsystems, and elements. Operation of the controller 130 within the context of the soil compaction mitigation system 100 is discussed in greater detail below.

In the harvester example, the work vehicle 102 includes front-end equipment, such as a header 120 and a cutter 122. The work vehicle 102 also includes a feeder house 124, a feed accelerator 126, and a thresher 128. The header 120 is pivotally coupled to the frame 180 to be driven by one or more actuators 134 about along pivot axis. The thresher 128 includes a threshing rotor 136 and a set of concaves 138. The work vehicle 102 also includes a cleaning subsystem or cleaning shoe (collectively referred to as cleaning subsystem) 142 that includes a cleaning fan 144, chaffer 146, and sieve 148. A discharge beater 150, tailings elevator 152, clean grain elevator 154, unloading auger 156, and spout 158 are provided to handling material within the work vehicle, and in particular, the clean grain elevator 154 functions to move clean grain into clean grain tank 160. The work vehicle 102 also includes a residue subsystem 162 that may include a chopper 164 and a spreader 166 to process the residue, as briefly discussed below.

The work vehicle 102 also includes a propulsion and navigation subsystem 168 with a powertrain 170 having a power source (e.g., an engine, motor, and/or batteries) that drives ground engaging components 172, such as wheels or tracks, via a transmission for propulsion and/or navigation. Generally, the powertrain 170, particularly the transmission, may include various gears, shafts, clutches, and other power transfer elements that may be operated in a variety of ranges representing selected output speeds and/or torques. In one example, the powertrain 170 may transfer power directly to the two or four driven wheels 172 and/or via traction drives at or near the wheels 172. Although not depicted in detail, the powertrain 170 may further include steering and/or braking mechanism for navigating the field such that the power source propels the work vehicle 102 along a desired path, as discussed in greater detail, based on operator commands, autonomous commands, and/or remote commands.

In operation and by way of overview, as the work vehicle 102 moves through a field, header 120 (and an associated reel 176) engages the crop to be harvested and gathers the crop toward cutter 122 to be cut. The severed crop material is moved through a conveyor in feeder house 124 toward feed accelerator 126, which accelerates the crop material into thresher 128. The crop material is threshed by threshing rotor 136 rotating the crop against concaves 138. The threshed crop material is moved by a separator 140 in which portion of the residue is moved by discharge beater 150 toward the residue subsystem 162 to be chopped by residue chopper 164 and spread on the field by spreader 166. In other configurations, the residue is released from the work vehicle 102 in a windrow.

The grain falls to cleaning subsystem 142. The chaffer 146 separates some larger pieces of material from the grain, and sieve 148 separates some of finer pieces of material from the clean grain. Clean grain falls to an auger that moves the grain to an inlet end of clean grain elevator 154, and the clean grain elevator 154 moves the clean grain upwards, depositing the clean grain in clean grain tank 160. Residue is removed from the cleaning subsystem 142 by airflow generated by cleaning fan 144. Cleaning fan 144 directs air along an airflow path upwardly through the sieves 148 and chaffers 146. The airflow carries residue rearwardly in the work vehicle 102 toward the residue subsystem 162.

The view of FIG. 2 also shows that, in one example, the work vehicle 102 includes various onboard sensors 190a-190f (generally, onboard sensors 190), including one or more location sensors 190a; one or more powertrain sensors 190b; one or more sink region sensors 190c; one or more soil sensors 190d; one or more weight sensors 190e; and/or one or more environmental sensors 190f, each of which may be coupled to provide information to the controller 130. In addition to the onboard sensors 190 described above, the work vehicle 102 may further include additional and/or alternative types of sensors. One or more of the onboard sensors 190 may be omitted. Generally, the onboard sensors 190 may be onboard the work vehicle 102, although in some instances, such data may be collected offboard the work vehicle 102 (e.g., on offboard machine 104).

The location sensor 190a may be considered any one or more location and/or position sensors, such as a GPS receiver, a LORAN system, a dead reckoning system, a cellular triangulation system, inertial measurement units (IMU), or other positioning system, to enable determination the location and/or position of the work vehicle 102. The location sensor 190a may function to provide geo-referenced coordinates for the data collected by the other sensors.

The powertrain sensors 190b represent the various sensors that measure and/or determine various characteristics associated with the powertrain 170. For example, the powertrain sensors 190b may determine the travel speed of the work vehicle 102 over the ground in any suitable manner, including using aspects of the location sensor 190a. The powertrain sensors 190b may further indicate the various status of the wheels 172, including the wheel slip. Further the powertrain sensors 190b may indicate the status of the various drive and/or transmission states (e.g., four-wheel drive v. two-wheel drive, drive capabilities, and the like).

The sink region sensors 190c may include any suitable type of sensor to detect and/or characterize standing water or wet soil in the field. Such sensors 190c may include optical sensors (e.g., cameras), infrared sensors, and radar or LIDAR systems that may be used to capture images of the surrounding environment and selected areas of the work vehicle 102. As discussed below, such images may be processed to extract sink region characteristics. The sink regions sensors 190c are depicted on the front of the work vehicle 102, e.g., to view potential sink regions in front of the work vehicle as the work vehicle approaches the potential sink regions. However, the sink regions sensors 190c may be arranged at in other positions of the work vehicle, e.g., to view potential sink regions around the work vehicle including in rows other than the present row and/or behind the work vehicle. In some examples, the sink region sensors 190c may include moisture sensors and/or cooperate or otherwise include soil sensors, such as those discussed below.

The soil sensors 190d may include one or more sensors that collect data regarding, and/or evaluate, the soil within the field. The soil sensors 190d may be located underneath and/or any suitable location on the work vehicle 102 and/or a separate machine (e.g., offboard machine 104). In some instances, the soil sensors 190d may measure various soil properties, including those associated with moisture and compaction, such as soil constituents, soil moisture, or soil porosity. The soil sensors 190d may additionally measure and/or facilitate the derivation of characteristics such as the absence of crops, washout conditions, and/or existing or anticipated compaction issues. As discussed below, one or maps may be created based on this data, as well as data from the other sensors.

The weight sensor 190e determines and/or otherwise facilitates the derivation of the present weight of the work vehicle 102, e.g., dynamically, in real time as the work vehicle traverses the field. As introduced above, the weight of the work vehicle 102 may change over time, such as upon accumulation of grain or upon dispersal of resources.

One or more of the environmental sensors 190f may provide current information about the environment near work vehicle 102. Without limitation, environmental sensors 190f may measure weather including wind speed and wind direction, temperature, humidity, gas, rainfall, solar radiation, air quality, vegetative coverage data, soil carbon/organic matter data, soil type, soil structure, soil pH, soil moisture, soil moisture forecast, soil temperature, soil temperature forecast, soil porosity, crop history, tillage history, soil lifeform inventory, and landscape position data indicating a direction that a terrain slope faces, as well as additional environmental data discussed below.

Generally, in one example, the soil compaction mitigation system 100 may be implemented by the controller 130, optionally in cooperation with the offboard machine 104 and/or control center 106, in order to navigate and/or plan for sink regions. In addition to the controller 130, in various examples, the soil compaction mitigation system 100 may be considered to include other aspects of the work vehicle 102, such as the powertrain 170, sensors 190, and/or interface 132 in order to implement the functions described herein.

Figure 3:
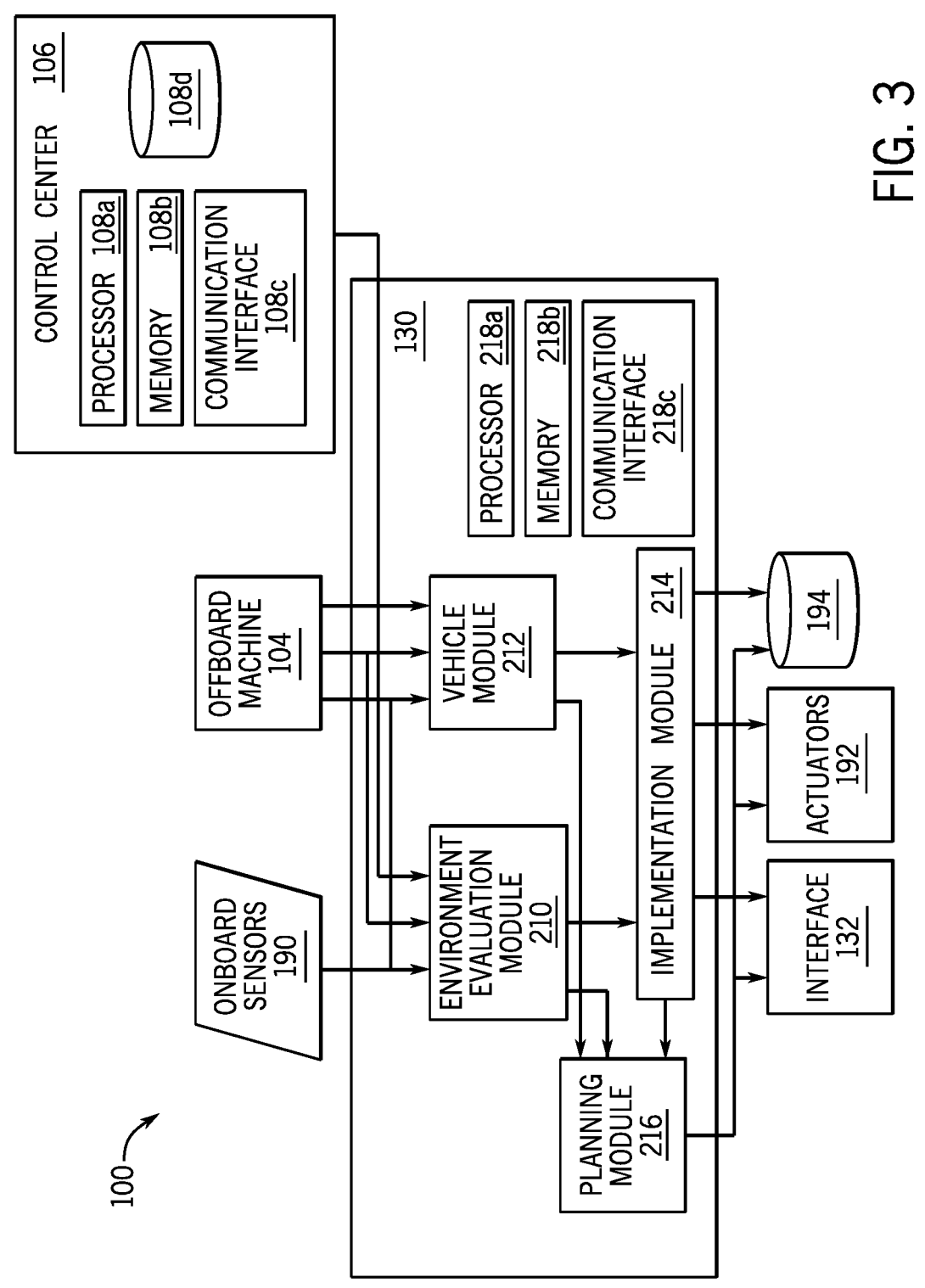
FIG. 3 is a dataflow diagram of the soil compaction mitigation system according to an example embodiment.

Referring now also to FIG. 3, a dataflow diagram illustrates an embodiment of the soil compaction mitigation system 100 implemented by the onboard sensors 190, controller 130 and external data sources (e.g., control center 106 and/or offboard machine 104) to execute the soil compaction mitigation functions to generate appropriate commands for implementation for soil compaction mitigation and/or planning via the interface 132, one or more actuators 192, and/or storage in database 194, as examples. Generally, the controller 130 may be considered a vehicle controller, distributed control components, or a dedicated controller. As discussed in greater detail below, the interface 132 depicted in FIG. 3 may be the vehicle interface 132 discussed with reference to FIG. 2, such that the output of the soil compaction mitigation system 100 may be communicated to the operator. In another example, the information may be communicated to interfaces with offboard the work vehicle 102. The actuators 192 of FIG. 3 broadly represent the various actuators of the work vehicle 102, including the actuators associated with the powertrain 170, e.g., in order to implement the path commands of the soil compaction mitigation system 100. Finally, the database 194 may represent memory or data storage onboard or offboard of the vehicle e102, e.g., in order to implement the path planning of the soil compaction mitigation system 100.

As introduced above, the soil compaction mitigation system 100 may receive data from one or more data sources. As examples, and as discussed in greater detail below, such data sources may include onboard sensors 190, the offboard machine 104, and the control center 106, as well as user inputs and/or other systems; and such data may include various forms of field, environmental, and vehicle information. As also discussed below, the controller 130 uses this data to render an evaluation of sink regions and to take steps to mitigate soil compaction and/or to most efficiently and effectively perform the designated agricultural tasks. The data flows and organization depicted in FIG. 3 are merely examples, and other mechanisms for performing similar functions may be provided, certain functions may be omitted, and additional functions may be added. Aspects of FIGS. 1 and 2 may be referenced below in the discussion of FIG. 3.

With respect to the soil compaction mitigation system 100 of FIG. 3, the controller 130 may be organized as one or more functional units or modules 210, 212, 214, 216 (e.g., software, hardware, or combinations thereof). As can be appreciated, the modules 210, 212, 214, 216 shown in FIG. 3 may be combined and/or further partitioned to carry out similar functions to those described herein. As an example, each of the modules 210, 212, 214, 216 may be implemented with processing architecture such as a processor 218a and memory 218b, as well as one or more suitable communication interfaces or units 218c. For example, the controller 130 may implement the modules 210, 212, 214, 216 with the processor 218a based on programs or instructions stored in memory 218b. Generally, the communication unit 218c may couple various system components including the memory 218b to the processor 218a, as well as components within and outside of the work vehicle 102. In one example, the communication unit 218c functions to enable wireless communication, including directly (e.g., via Bluetooth®, radio frequency signals, or the like) or over a network. Thus, the communication unit 218c may include a Bluetooth® transceiver, a radio transceiver, a cellular transceiver, an LTE transceiver, and/or a Wi-Fi transceiver. For example, such communications may utilize one or more of various communication techniques or mechanisms, including radio frequency, Wi-Fi, cellular, telematics, and/or any other suitable platforms.

In some examples, the consideration and implementation of the soil compaction mitigation functions by the controller 130 are continuous, e.g., constantly active. In other examples, the activation of the soil compaction mitigation functions may be selective, e.g., enabled or disabled based on input from the operator or other considerations. In any event, the soil compaction mitigation functions may be enabled and implemented by the soil compaction mitigation system 100, as described below.

As shown, generally, the controller 130, particularly an environment evaluation module 210 and a vehicle module 212, may receive input data in a number of forms and/or from a number of sources. In FIG. 3, the environment evaluation module 210 and vehicle module 212 are depicted as receiving input data from onboard sensors 190, the offboard machine (or machines) 104, and the control center 106, although such input data may also come in from other systems or controllers, either internal or external to the work vehicle 102. Although the various types of data may be provided from one or more of the sources, a summary of the general types of data provided by each data source is provided below prior to a more detailed discussion of the types of data and the processing of the modules 210, 212, 214, 216.

Generally, the data from onboard sensors 190 may include data associated with the vehicle 102 and the sink regions within the field. In particular and with respect to the vehicle 102, the onboard sensors 190 may provide information concerning the weight, powertrain configuration, and traction. Moreover, and with respect to the sink regions (e.g., sink regions 116 of FIG. 1), the onboard sensors 190 may further provide image or sensor data from which sink region characteristics may be extracted, including size, depth, etc.

As referenced above, the offboard machine 104 may additionally provide sink region information, as well as environmental information (e.g., temperature, humidity) that enables identification of present condition of sink regions and predictions about the future conditions of the sink regions. Such data may be correlated geographically and temporally. Finally, as also referenced above, the control center 106 may provide historical data and/or soil information such that evaluations and/or predictions about potential soil compaction impact may be performed. As shown, the control center 106 (as well as the offboard machine 104) may generally include any appropriate features for carrying out designated functions, including a processor 108a, memory 108b, and a communications interface 108c that couples various system components including the memory 108b to the processor 108a, as well as components outside of the control center 106 (e.g., the work vehicle 102 and/or the offboard machine 104). As above, the processor 108a may include any suitable processing component to execute instructions stored in memory 108b. As also discussed above, communication interface 108c functions to enable wireless communication, including directly (e.g., via Bluetooth®, radio frequency signals, or the like) or over a network.

As an example and as discussed in greater detail below, at least the environment evaluation module 210 is configured to receive information associated with the sink regions (e.g., sink regions 116). As noted above, such information may be in the form of sensor data from which sink region characteristics may be extracted. As examples, such sink region characteristics may include location, severity, size, dimensions, depth, changes, time, etc. The sink region information may additionally include the soil characteristics and topography of the underlying terrain of the sink regions. In addition to the onboard sensors 190 collecting information in real-time as the vehicle 102 traverses the field 110, the sink region information may be by offboard machine 104 and/or the control center 106. In other words, the offboard machine 104 in the form of a drone or cooperating machine may provide the potential current or past sink region characteristics; and/or the control center 106 may provide the current, past, or predicted sink region characteristics.

As an example and as discussed in greater detail below, at least the vehicle module 212 is configured to receive information associated with the vehicle 102. As noted above, such information may be in the form of sensor data, particularly onboard sensors 190 onboard the vehicle 102, although other types of data may originate from other sources (e.g., offboard machine 104 and/or control center 106). In one particular example, the vehicle information may include dynamic or real-time weight information associated with the work vehicle 102, as discussed in greater detail below. In a further example, vehicle information may include data associated with the configuration and/or status of the powertrain 170, traction, and/or slip conditions. Such information may characterize the navigation capabilities and potential for soil compaction by the work vehicle 102 in order for the evaluation of responses to sink regions, as discussed in greater detail below.

As an example, and as discussed in greater detail below, at least the environment evaluation module 210 is configured to receive information associated with the environment of the field 110. Such information may originate from the onboard sensors 190 of the vehicle 102, as well as the offboard machine 104 and/or control center 106. Additionally, such data may be current, historical, or predicted. In some examples, the environmental data may be in the form of a map. Without limitation, the environmental data may include the following examples types of information: (1) weather data including wind speed and direction, temperature, humidity, day length, sun angle, sky cover, and the like, including current conditions or short- and long-term weather forecasts with temperature, precipitation, precipitation type, snow cover, and the like; (2) soil surface data including the terrain and the slope or the terrain, the landscape position data, e.g., the direction the slope is facing, soil surface temperature and forecast, soil surface moisture, soil color, and the like; (3) the amount and/or nature of existing biomass or unharvested crop, existing residue cover, existing residue constituent levels, and the like; (4) sub-surface soil data including soil type, soil constituents, soil structure, soil pH, soil moisture, and soil nutrient levels; and (5) tillage data including past and planned tillage operations including date and type, and other crop history.

Additionally information regarding the processing of the data described above is provided below in the discussion of the function and results of the modules 210, 212, 214, 216.

Primarily, the environment evaluation module 210 functions to evaluate the data from various sources, including from the onboard sensors 190, the offboard machine 104, and/or the control center 106 to identify and/or evaluate potential sink regions (e.g., sink regions 116). In some examples, the environment evaluation module may extract sink characteristics from various sources of data (e.g., from images collected by the onboard sensors 190). As noted above, the sink region characteristics received and/or generated from data may include location, dimensions, depth, changes, time, etc. In some examples, the environment evaluation module 210 may correlate the potential sink region characteristics from various data sources, e.g., based on location or time. The environment evaluation module 210 may additionally receive the environmental information. Such information may be provided to the implementation module 214 and/or the planning module 216.

Generally, the vehicle module 212 functions to collect and extract information regarding the vehicle 102 from one or more sources, including the onboard sensors 190 of the vehicle. As noted above, vehicle module 212 may receive and/or evaluate information from the onboard sensors 190, particularly information associated with the current vehicle weight. Typically, as the vehicle 102 traverses the field 110, the vehicle 102 may increase or decrease in weight. For example, the work vehicle 102 may process and store crop material such that the weight increases over time; or the vehicle may be in the form of a sprayer that distributes liquid during operation such that the weight decreases over time. In some examples, the weight of fuel may be significant. In effect, the vehicle module 212 may calculate or otherwise derive the real-time vehicle weight and provide the vehicle weight to the implementation module 214. Additional vehicle characteristics collected and/or extracted by the vehicle module 212 include traction information, e.g., information associated with wheel slip and may generally reflect the interaction between the tires of the work vehicle 102 and the field surface. As described below, such information may be provided to the implementation module 214 and/or planning module 216 and generally informs the evaluation about the potential for navigation through a sink region and/or the potential for soil compaction within the sink region.

Generally, the implementation module 214 receives and considers the sink region characteristics, vehicle characteristics, and the environmental information. In response, the implementation module 214 generates an implementation plan for accommodating the sink region in view of potential soil compaction and the ability of the work vehicle to navigate. In particular, the implementation module 214 may generate an implementation plan with sink region path that 1) goes through the sink region, e.g., along the original path; 2) partially goes through the sink region, e.g., avoiding certain areas of the sink region but traversing other areas; or 3) completely avoids the sink regions, including going around the sink region or turning the vehicle completely around to avoid the sink region. The implementation plan may include suggestions and other types of information provided to an operator via the display on interface 132. Moreover, the implementation plan may include commands for the actuators 192. The implementation module 214 may further provide updated maps and/or other information to a database 194, which may be a database associated with the work vehicle 102 or correspond to the database 222 of the control center 106.

The implementation module 214 may generate the sink region (or "alternative") path of the implementation plan based on a number of considerations. Initially, the sink region path is planned such that the work vehicle 102 may complete the path, e.g., such that the work vehicle 102 does not get stuck or otherwise substantially impeded. As noted above, this consideration may be a function of at least the ground condition and other sink region characteristics, the weight of the work vehicle 102, and the drivetrain characteristics of the work vehicle (e.g., whether or not the vehicle is four-wheel drive, two-wheel drive, front-wheel drive, rear-wheel drive, and other torque and traction characteristics). In some examples, the number and type of tires or tracks and their pressures may be considered. In particular, when the work vehicle 102 is relatively heavy some sink regions 116 may present challenges that may not be issues as compared to when the work vehicle 102 is lighter. The ability to navigate may be expressed in any suitable manner, including a minimum anticipated traction, a maximum allowable wheel slip, and/or an amount of sinking estimated to be encountered by the work vehicle.

As a further consideration, the implementation module 214 generates the sink region path of the implementation plan based on the potential for problematic soil compaction, which may be referenced as "potential soil compaction impact." In one example, the implementation module 214 may have one or more soil compaction constraints for a field or a crop representing limits, objectives, thresholds or targets for levels of soil compaction to be imposed upon the underlying land as work vehicle 102 drives across such areas. The soil compaction constraints may be based upon information such as historical crop yield information, planned interaction techniques (planting techniques, cultivating techniques, harvesting techniques), soil moisture data, topography data, soil type information, historical soil compaction data, overhead imagery of the land, past and/or future weather information, seed or crop characteristics or data, and the like.

In one example, a field may have a varying soil compaction constraints in different locations across the field. In other examples, particularly if the characteristics of the field 110 are relatively uniform, the field may have a single or default soil compaction constraint. During operation, if the potential soil compaction impact exceeds the soil compaction constraint, then the module 214 may generate the sink region path; and if the potential for soil compaction does not exceed the soil compaction constraint, then the module 214 may generally implement the default path, subject to navigation issues discussed above.

In some examples, the soil compaction constraint and/or the evaluation thereof may be a function of various factors, including vehicle weight, tire configurations, sink region characteristics, present compaction estimates, topography, soil characteristics, and the like. For example, the work vehicle 102 traversing a particular area at a relatively heavy weight may exceed the soil compaction constraint (e.g., to result in excessive compaction), and the work vehicle 102 traversing the same area at a relatively light weight may not exceed the same soil compaction constraints (e.g., such that any compaction is acceptable). Such varying soil compaction characteristics, in an example implementation, mean those characteristics of work vehicle 102 that may vary such that work vehicle 102 may cause different degrees or extents of soil compaction at different times upon the exact same underlying region of land under the exact same environmental conditions. As another example, the work vehicle 102 traversing a particular area with first sink region characteristics (e.g., relatively more collected water) may exceed the soil compaction constraint, while other areas within the same sink region having second sink region characteristics (e.g., relatively less collected water) may not exceed the same soil compaction constraints. Moreover, such paths may be considered with respect to previous activity in the respective area. For example, considering a sink region that spans multiple rows, during a first evaluation of the sink region along the path of a first row that includes may result in a first sink region path; and during a second evaluation of the sink region along the path of a second row that includes the sink region, the implementation module 214 may again consider the first sink region path and the resulting compaction of the previous traversal such that a repeat of the first sink region path may result in exceeding the soil compaction constraint. In other words in such an example, the implementation module 214 may evaluate the previous compaction impact of the work vehicle 102 during operation along the field.

As such, the implementation module 214 may generate soil region paths as part of implementation plans in order to successfully traverse the field while completing the agricultural operation. The soil region paths may be implemented in a number of ways.

For example, the implementation module 214 may generate display signals such that a proposed path or modifications to the present path to result in the proposed path are generated for the operator of the work vehicle 102. In effect, the implementation module 214 may generate alerts or guidance to the operator via the interface 132.

As a further example, the implementation module 214 may generate commands to autonomously or semi-autonomously implement the soil region path. Such commands may be provided to the actuators 192 (generally representing the various actuators of the work vehicle 102, including actuators associated with the powertrain 170, steering, braking, etc.). Further, the implementation module 214 may store characteristics and data associated with the soil region path in a database 194.

As introduced above, the soil compaction mitigation system 100 may further include the planning module 216. In one example, the planning module 216 may receive the sink region characteristics, environmental characteristics, and vehicle characteristics from one or more of the environment evaluation module 210 and/or the vehicle module 212, as well as the alternative sink region path generated by the implementation module 214. Generally, upon generation of the sink region path by the implementation module 214, the planning module 216 functions generate a prescription or plan for dealing with the sink region at a later time.

In one example, the planning module 216 may generate a prescription or plan for dealing with the area subject to the current sink region. For example, the sink region prescription may include returning to the area of the sink region at a later time in the day, on a different day, or not at all. The sink region prescription may be expressed in any suitable manner, including a designated time to return, a target weight to return, or the like.

As noted, the sink region prescription may be a function of the sink region characteristics, environmental characteristics, and vehicle characteristics. As example, the vehicle characteristics may include the anticipated weight, which may change over time, such as upon the use of fuel or an offload of crop such that the work vehicle 102 will be lighter and have the ability to more easily navigate or avoid undue compaction at the sink region. As a further example, the sink region characteristics and environmental characteristics may include the anticipated size of the sink region in view of the soil type, weather forecast, and the like. In effect, the sink region may disappear or shrink to acceptable navigation or compaction constraints. Additionally, crop or economic considerations may impact the sink region prescriptions. For example, based on the various vehicle, sink region, and environmental characteristics, it may be determined that it is not economically feasible to attempt to perform the agricultural operation at the sink region, e.g. due to the economic value of the crop in view of the fuel costs, delays, or the like.

As such, the planning module 216 may generate sink region paths as part of sink region prescriptions at a designated or estimated time or date in order to potentially traverse the field to complete the agricultural operation. Similar to the soil region paths by the implementation module 214, the sink region prescriptions in a number of ways, including display signals, autonomous or semi-autonomous commands, and/or database storage.

Figure 4:
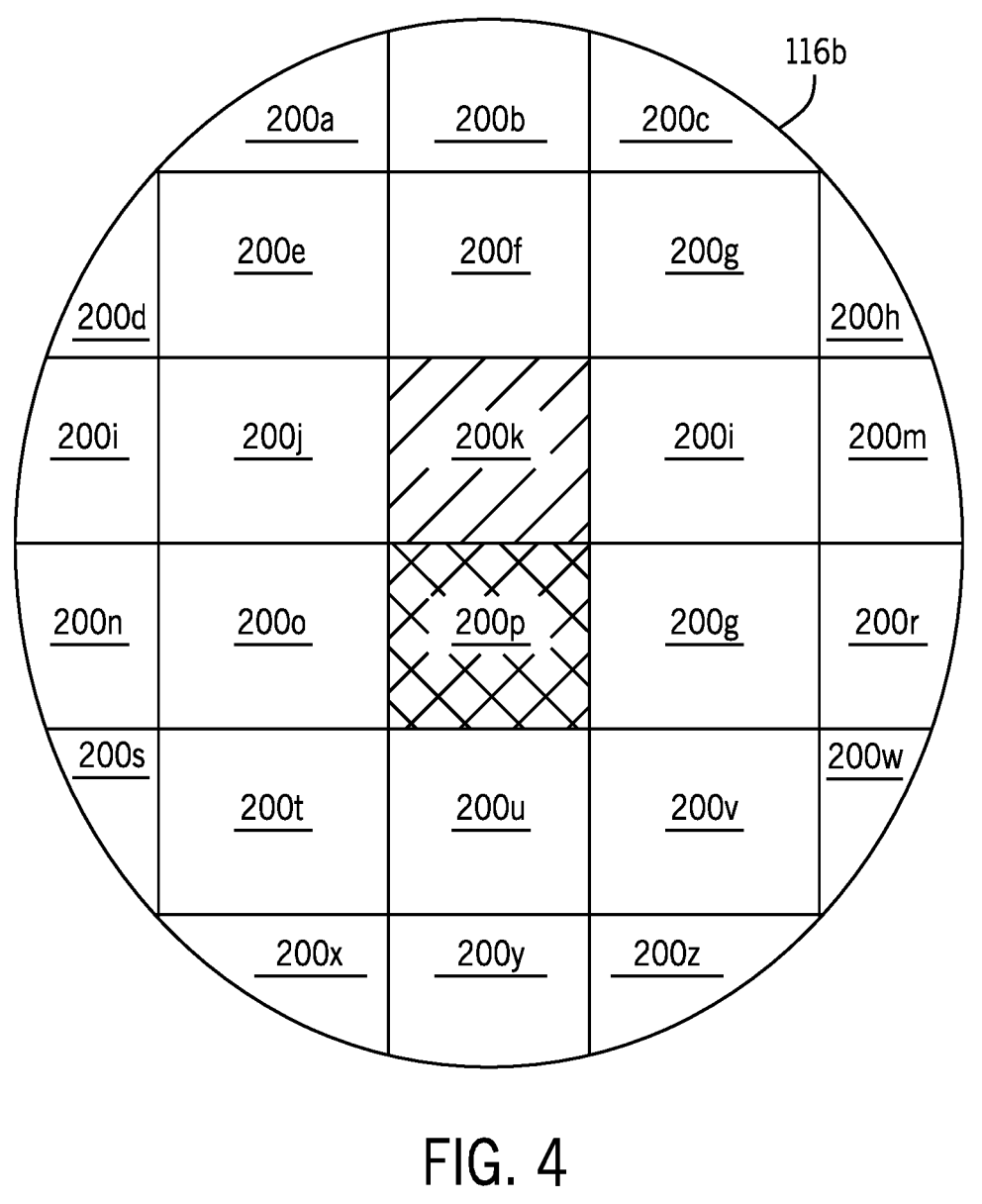

Reference is briefly made to FIG. 4, which is an example sink region 116b that may be evaluated and addressed by the soil compaction mitigation system 100, particularly the implementation module 214 and the planning module 216. As shown, the sink region 116b may be considered segmented or partitioned into a number of areas 200a-200z, each of which may be evaluated by the implementation module 214. In particular, all areas 200a-200z may be considered part of the sink region 116b; and areas 200a-200j, 200i-2000, 200g-200z may have generally similar navigation and/or compaction characteristics (e.g., "first navigation and compaction characteristics"), while area 200k may have second navigation and/or compaction characteristics and area 200p may have third navigation and/or compaction characteristics, each different from the first navigation and/or compaction characteristics and one another. The implementation module 214 may consider each area individually in the planning of the alternative sink region path. For example, the implementation module 214 may consider that the areas 200a-200j, 200i-2000, 200g-200z with the first navigation and/or compaction characteristics are presently suitable for navigation and the soil compaction, if any, is acceptable; and the implementation module 214 may further consider that areas 200k, 200p with the second and third navigation and/or compaction characteristics are not suitable for navigation and/or will result in undue compaction. As such, the implementation module 214 generates an alternative sink region path that potentially goes through any of the areas other than 200k, 200p in order to continue operation. Subsequently, the planning module 216 may consider how to address any regions that were omitted or avoid during the alternative sink region path, particularly areas 200k, 200p. As noted, area 200k may have different navigation and soil compaction characteristics than area 200p such that each area may be considered individually. For example, area 200k may not have as severe or extreme navigation and soil compaction characteristics as area 200*p* such that area 200*k* may be able to be addressed later in the same day as areas 200*a*-200*j*, 200*i*-2000, 200*g*-200*z* while area 200*p* may not be addressed for some time. As noted above, such considerations may depend on factors such vehicle weight and weather or other environmental characteristics, as well as economic considerations.

Figure 5:
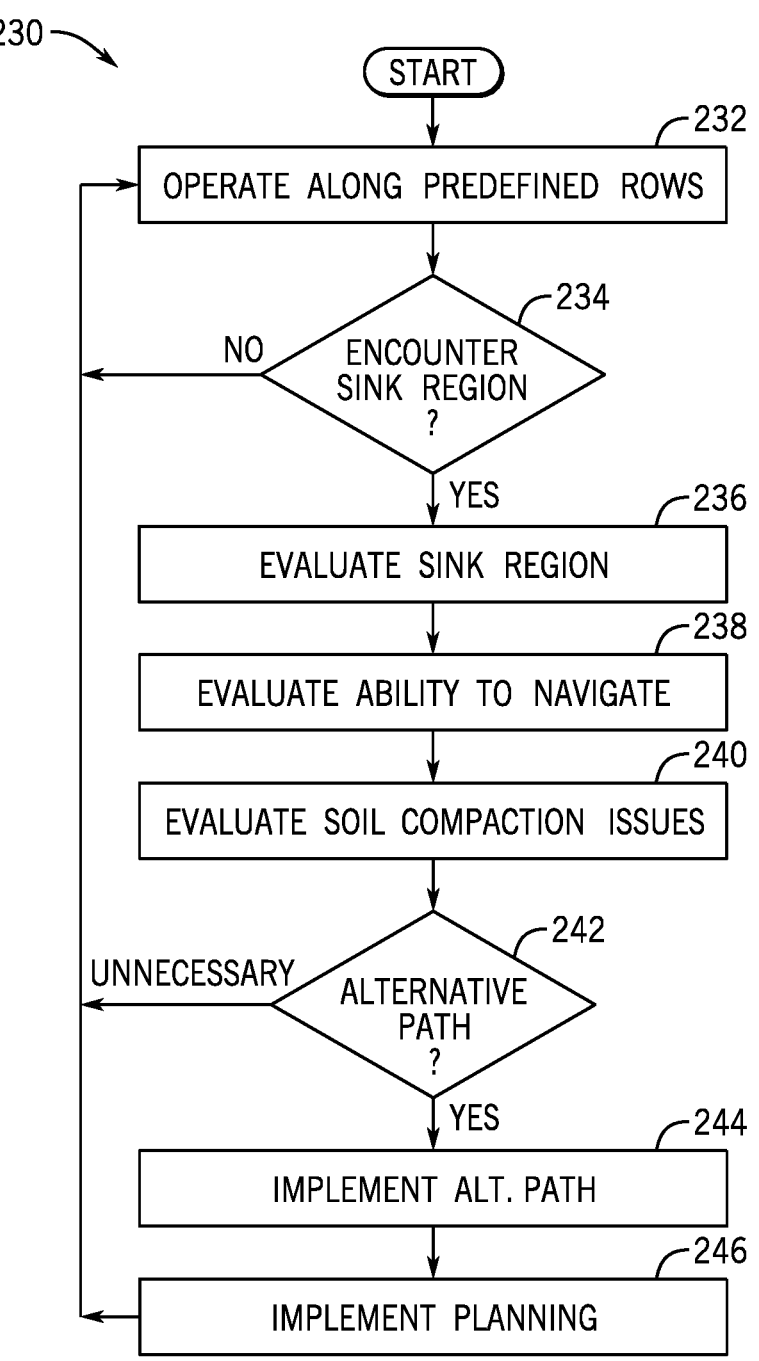
FIG. 5 is a flow chart depicting an agricultural soil compaction mitigation method according to an example embodiment.

The soil compaction mitigation system 100 discussed herein may further be embodied as a method 230, such as depicted in the flowchart of FIG. 5. The method 230 may implemented by the controller 130 within the soil compaction mitigation system 100 discussed above. In an initial step 232, the vehicle 102 operates along the predefined rows. Using the example of FIG. 1, the vehicle 102 may operate along the rows 114 (e.g., along row 114*a*, then row 114*b*, and so on). In a step 234, the soil compaction mitigation system 100 may evaluate the environment for sink regions. Again, in the example of FIG. 1, there may be a number of sink regions 116 encountered by the work vehicle 102. If no sink region is encountered in step 234, the soil compaction mitigation system 100 continues to operate in the predefined rows as the method 230 returned to step 232. Upon encountering a sink region, the method 230 proceeds to step 236 in which the sink region characteristics are extracted or otherwise determined and evaluated. In step 238 of method 230, the soil compaction mitigation system 100 evaluates the ability of the work vehicle 102 to navigate through the sink region. In step 240 of method 230, the soil compaction mitigation system 100 evaluates the soil compaction issues with the sink region in view of various characteristics, including the vehicle weight. In step 242 of method 230, the soil compaction mitigation system 100 determines if an alternative path is necessary in view of the ability of the work vehicle to navigate in step 238 and the soil compaction issues in step 240. If the vehicle 102 is able to navigate the sink region (e.g., step 238) and there are no soil compaction issues (e.g., step 240), the alternative path in step 242 is not necessary and method 230 returns to step 232 and the work vehicle 102 may proceed along the predefined rows. If the work vehicle 102 is not able to navigate the sink region (e.g. step 238) or there are soil compaction issues associated with the sink region (e.g. step 240), the method 220 proceeds to step 244 in order to implement the alternate path. For example and briefly referencing the example of FIG. 1, the soil compaction mitigation system 100 may divert from a respective rows 114 and implement a respective path 118. Referring to the example of FIG. 3, the implementation module 214 may generate the associated commands, e.g., as display commands, actuation commands, or the like. Further, the method 230 may proceed to step 246 such that the system 100 may implement the planning function. In effect, the soil compaction mitigation system 100 may determine a prescription or plan for returning to the area of the sink region based on various factors, including vehicle weight, environmental characteristics, and the like. Referring to the example of FIG. 3, the planning module 216 may generate the associated commands, e.g., as display commands, actuation commands, or the like. Generally, upon completion of step 246, the method 230 may return to step 232 to operate along the predetermined rows until completion of the agricultural operation.

Accordingly, the systems and methods discussed above provide a mechanism for dealing with sink regions that provides improvements with respect to production, efficiencies, and/or soil and crop quality.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As will be appreciated by one skilled in the art, certain aspects of the disclosed subject matter can be embodied as a method, system (e.g., a work machine control system included in a work machine), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The term module may be synonymous with unit, component, subsystem, sub-controller, circuitry, routine, element, structure, control section, and the like.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of work vehicles.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An agricultural system associated with an agricultural work vehicle configured to operate at least along a default path within a field during an agricultural operation, comprising:
  a sink region sensor configured to collect information regarding a sink region within the field;
  a vehicle sensor configured to collect information regarding current vehicle weight when proximate to the sink region within the field; and
  a controller coupled to the sink region sensor and the vehicle sensor and including processor and memory architecture executing control logic to:
    receive the sink region information and extract sink region characteristics from the sink region information;
    receive the current vehicle weight;
    determine a potential soil compaction impact of the agricultural work vehicle traversing the sink region in view of the sink region characteristics and the current vehicle weight;
    generate commands associated with a sink region path to at least partially avoid the sink region when the potential soil compaction impact exceeds a soil compaction constraint for the sink region; and
    generate commands to proceed along the default path when the potential soil compaction impact does not exceed the soil compaction constraint.

2. The agricultural system of claim 1, wherein the processor and the memory architecture of the controller are configured to further execute control logic to:
  evaluate an ability of the agricultural work vehicle to navigate the sink region along the default path in view of the sink region characteristics and the current vehicle weight;
  generate the commands associated with the sink region path to at least partially avoid the sink region when the potential soil compaction impact exceeds a sink region constraint or when the evaluation of the ability of the agricultural work vehicle to navigate the sink region along the default path indicates that the agricultural work vehicle is unable to navigate through the sink region along the default path; and
  generate commands to proceed along the default path when the potential soil compaction impact does not exceed the sink region constraint and when the evaluation of the ability of the agricultural work vehicle to navigate the sink region along the default path indicates that the agricultural work vehicle is able to navigate through the sink region along the default path.

3. The agricultural system of claim 2, wherein the vehicle sensor is on-board the agricultural work vehicle.

4. The agricultural system of claim 2, wherein the sink region sensor is on-board the agricultural work vehicle.

5. The agricultural system of claim 2, further comprising a soil sensor coupled to the controller and configured to collect soil information within the field, and wherein the processor and the memory architecture of the controller are configured to further execute control logic to:
  receive the soil information and to extract soil characteristics from the soil information; and
  determine the potential soil compaction impact further in view of the soil characteristics.

6. The agricultural system of claim 1, wherein the sink region sensor is an image sensor.

7. The agricultural system of claim 1, further comprising a display interface coupled to the controller and configured to display the commands associated with the sink region path to an operator.

8. The agricultural system of claim 1, wherein the commands associated with the sink region path are actuator commands for navigating the agricultural work vehicle.

9. The agricultural system of claim 1, wherein the sink region sensor is offboard of the agricultural work vehicle.

10. The agricultural system of claim 1, wherein the agricultural work vehicle is a harvester.

11. A method of evaluating sink regions within a field associated with an agricultural work vehicle performing an agricultural operation along at least a default path, the method comprising:
  collecting, with a sink region sensor, information regarding a first sink region within the field;
  collecting, with a vehicle sensor, information regarding current vehicle weight when proximate to the first sink region within the field;
  extracting, with a controller, sink region characteristics from the sink region information;
  determining, with the controller a potential soil compaction impact of the agricultural work vehicle traversing the sink region in view of the sink region characteristics and the current vehicle weight;
  generating, with the controller, commands associated with a sink region path to at least partially avoid the first sink region when the potential soil compaction impact exceeds a soil compaction constraint for the first sink region; and generating, with the controller, commands to proceed along the default path when the potential soil compaction impact does not exceed the soil compaction constraint.

12. The method of claim 11, further comprising:

evaluating, with the controller, an ability of the agricultural work vehicle to navigate the sink region along the default path in view of the sink region characteristics and the current vehicle weight;

generating, with the controller, the commands associated with the sink region path to at least partially avoid the sink region when the potential soil compaction impact exceeds a sink region constraint or when the evaluation of the ability of the agricultural work vehicle to navigate the sink region along the default path indicates that the agricultural work vehicle is unable to navigate through the sink region along the default path; and generating, with the controller, commands to proceed along the default path when the potential soil compaction impact does not exceed the sink region constraint and when the evaluation of the ability of the agricultural work vehicle to navigate the sink region along the default path indicates that the agricultural work vehicle is able to navigate through the sink region along the default path.

13. The method of claim 12, wherein the vehicle sensor is on-board the agricultural work vehicle.

14. The method of claim 12, wherein the sink region sensor is on-board the agricultural work vehicle.

15. The method of claim 12, further comprising:

collecting, with a soil sensor, soil information within the field;

extracting, with the controller, soil characteristics from the soil information; and determining, with the controller, the potential soil compaction impact further in view of the soil characteristics.

16. The method of claim 11, wherein the sink region sensor is an image sensor.

17. The method of claim 11, further comprising displaying, on a display interface, the commands associated with the sink region path.

18. The method of claim 11, further comprising executing, with agricultural work vehicle actuators, the commands associated with the sink region path.

19. The method of claim 11, wherein the sink region sensor is offboard of the agricultural work vehicle.

20. The method of claim 11, wherein the agricultural work vehicle is a harvester.

* * * * *